(12) United States Patent
DeBruyne

(10) Patent No.: US 6,935,610 B1
(45) Date of Patent: Aug. 30, 2005

(54) PARTIAL STROKE VALVE TEST APPARATUS

(75) Inventor: Todd W. DeBruyne, West Olive, MI (US)

(73) Assignee: Dynatorque, Inc., Muskegon, MI (US)

( * ) Notice: Subject to any disclaimer, the term of this patent is extended or adjusted under 35 U.S.C. 154(b) by 25 days.

(21) Appl. No.: 10/605,505

(22) Filed: Oct. 3, 2003

Related U.S. Application Data

(60) Provisional application No. 60/319,878, filed on Jan. 17, 2003.

(51) Int. Cl.[7] ............................................. F16K 35/00
(52) U.S. Cl. ...................................... 251/93; 251/100
(58) Field of Search ..................... 251/90–93, 95–100

(56) References Cited

U.S. PATENT DOCUMENTS

| | | | | |
|---|---|---|---|---|
| 5,190,263 A | * | 3/1993 | Roberts ........................ | 251/60 |
| 5,329,959 A | * | 7/1994 | Owen et al. ............ | 137/315.17 |
| 5,469,737 A | * | 11/1995 | Smith et al. ................... | 73/168 |

* cited by examiner

Primary Examiner—Justine R. Yu
Assistant Examiner—Peter deVore
(74) Attorney, Agent, or Firm—McGarry Bair PC

(57) ABSTRACT

A partial stroke valve testing apparatus is operably inserted between an emergency shutdown valve and a valve actuator, and comprises a drive cam attached to a drive shaft interconnecting the valve and actuator and an engagement cam attached to an engagement shaft which can be rotated from an operational position to a testing position to bring the engagement cam into operable communication with the drive cam. A key is locked to the engagement shaft to rotate the engagement shaft, and can be removed only when the engagement shaft is in the operational position. A safety stop mechanism prevents the engagement shaft from inadvertently rotating out of the operational and testing positions. A spring-biased pin engages radially-spaced detent seats in the engagement shaft to provide a positive indication of the position of the engagement shaft.

36 Claims, 12 Drawing Sheets

US 6,935,610 B1

PARTIAL STROKE VALVE TEST APPARATUS

CROSS REFERENCE TO RELATED APPLICATIONS

This application claims the benefit of U.S. provisional application Ser. No. 60/319,878, filed Jan. 17, 2003, which is incorporated herein in its entirety.

BACKGROUND OF INVENTION

1. Field of the Invention

The invention relates to an apparatus for testing the performance of a safety shut-off valve. In one aspect, the invention relates to a partial stroke valve testing apparatus having an activation key to adjust the apparatus from a testing position to an operating position and which can be locked in the testing position to indicate that the valve testing apparatus is in the testing condition. In another aspect, the invention relates to a partial stroke valve testing apparatus having a safety release mechanism which must be disengaged in order to place the apparatus in the testing position. In another aspect, the invention relates to a partial stroke valve testing apparatus having a remotely controlled and monitored test activation system.

2. Description of the Related Art

Industrial process plants, such as chemical plants and oil refineries, which utilize production piping and valving, are typically required to have safety equipment installed. This safety equipment includes emergency shutdown valves (ESD valves) which can be quickly closed to isolate sections of piping which may have developed a leak or some other safety problem. An actuator is attached to the ESD valve through a drive shaft which is turned by the actuator to quickly close a valve that generally remains open during production. Such actuators include "spring-to-fail" actuators, which are spring-biased to a "valve closed" position, but are maintained in a "valve open" position by air pressure. These valves automatically close under the influence of the spring in the event of a loss of air pressure. Air pressure loss can occur by a breach in the air pressure system resulting from an accident, or by the selective bleeding of the pressurized air by an operator in response to an emergency.

It is imperative that such valves are fully operational in the event of an emergency and, thus, it is necessary to periodically test the actuators and valves in order to insure that they are capable of operating properly in an emergency. However, a testing program that involves closing and opening all the safety valves in a production facility would significantly disrupt production and impose a substantial economic burden on the plant. One alternative is to utilize a bypass valve and piping around the ESD valve. When the bypass valve is opened, the ESD valve and its safety system can be fully tested without affecting production. However, space constraints and the additional cost in the bypass valve and piping may preclude this as an acceptable alternative.

A second alternative is the use of a partial stroke valve testing apparatus. This apparatus is typically inserted between the valve and the actuator, and enables the valve to be partially closed, thereby enabling all of the safety features to be tested but without interrupting production as would occur with fully closing the valve. A drive mechanism in the valve testing apparatus prevents the actuator from closing the valve more than a specified percentage of full closure when the drive mechanism is engaged. An example of such an apparatus is shown in FIG. 1, which is a perspective view of a prior art partial stroke valve test apparatus showing the interior components of the apparatus, and FIG. 2, which is a plan view of the prior art partial stroke valve test apparatus illustrated in FIG. 1.

Referring now to FIGS. 1 and 2, the valve testing apparatus comprises a hollow housing 200 defining a chamber 201 enclosing a drive cam 202. (The testing apparatus is normally provided with a cover, which has been removed in FIGS. 1 and 2 to show the interior components of the testing apparatus.) The drive cam 202 is fixedly attached to a drive shaft 206, shown in FIGS. 1 and 2, for example, as keyed together by a key 208 so that rotation of the drive shaft 206 will urge the rotation of the drive cam 202. The drive cam 202 is provided with a planar, radially-extending face 204.

Adjacent to the drive cam 202 is an engagement shaft 212 comprising an elongated, generally cylindrical member having a key end 203, a bearing end 205, and a longitudinal axis orthogonal to the longitudinal axis of the drive shaft 206. The engagement shaft 212 is provided with an asymmetrical engagement cam 210 having a shoulder 214 and a planar engagement cam face 216 orthogonal to the longitudinal axis of the engagement shaft 212. The engagement shaft 212 is seated in bearings in the housing 200 for rotation of the engagement shaft 212 and the engagement cam 210 within the housing 200.

A key hole 218 provides access to the key end 203 of the engagement shaft 212 and comprises a slot 222 for receipt of a key 220. The key 220 comprises a flattened, generally T-shaped body having a handle 228, and a shaft 230 extending generally orthogonally therefrom and terminating in a fork end 232 opposite the handle 228. The fork end 232 terminates in a pair of parallel, spaced-apart fingers 234 parallel to the shaft 230. A pair of spaced-apart wells (not shown) adapted for mating communication with the fingers 234 are provided in the end of the engagement shaft 212. The fork end 232 of the key 220 can be inserted through the slot 222 into the wells in the shaft 212, and the key 220 rotated 90°, thereby rotating the shaft 212 into a testing position. The fork end 232 is adapted to rotate 90° to the slot 222 so that removal of the key 220 will be prevented while the apparatus is in the testing configuration.

A detent mechanism is provided to position the engagement shaft 212 and the engagement cam 210 properly in the testing and operational positions. This comprises a detent seat 226 in the bearing end 205 which operably communicates with a spring-biased detent 224, which is a type well-known in the art and is mounted in the housing 200 in radial alignment with the engagement shaft 212. An operator turning the engagement shaft 212 with the key 220 will feel the action of the detent 224 engaging the detent seat 226 to indicate the proper positioning of the engagement shaft 212. The detent mechanism will also minimize the potential for the shaft 212 to inadvertently rotate.

The testing apparatus is inserted between an ESD valve and actuator so that the housing 200 is connected at a first side to a mounting flange on the valve bonnet and at a second side to the drive face of the actuator (not shown). The drive shaft 206 is operably connected to the ESD valve and actuator so that activation of the actuator will rotate the drive shaft 206, thereby operating the ESD valve.

As shown in FIG. 1, with the engagement cam 210 positioned so that the cam shoulder 214 is oriented away from the drive cam 202, the drive cam 202 can rotate past the engagement cam 210 when the drive shaft 206 is rotated, enabling the ESD valve to be fully closed in the event of an emergency. The valve testing apparatus is normally maintained in this operational condition so that the ESD valve is fully operational in the event of an emergency. However, when the engagement shaft 212 is rotated to a testing position so that the cam shoulder 214 is oriented adjacent the drive cam 202, rotation of the drive cam 202 during the test will bring the drive cam face 204 into contact with the engagement cam face 216, thereby preventing further rotation of the drive cam 202 and the drive shaft 206 and further closure of the ESD valve. Thus, the test can be performed by partially closing the valve without a costly interruption in plant production.

The engagement shaft 212 is rotated by inserting the first end 234 of the key 220 into the end of the engagement shaft 212 and rotating the key 220 90°. The position of the key 220 will provide some visual indication that the valve testing apparatus is in the testing condition. If the valve testing apparatus is inadvertently maintained in the testing condition, it will not operate properly in the event of an emergency.

SUMMARY OF INVENTION

In one embodiment of the invention, a partial stroke valve test apparatus has a housing enclosing a drive cam operably attached through a shaft to an actuator and an emergency shutdown valve, an engagement cam attached to a cylindrical engagement shaft for selectively engaging with the drive cam during a partial stroke valve test and selectively rotated between a test position in which the engagement cam engages with the drive cam and an operational position in which the engagement cam is rotated away from the drive cam, and a detent mechanism radially communicating with the engagement shaft for selectively maintaining the partial stroke valve test apparatus in the test position or the operational position.

The partial stroke valve test apparatus can also comprise a safety release mechanism in communication with one of the engagement shaft and the engagement cam which can be selectively disengaged for rotation of the engagement cam between the test position and the operational position, and a key for selectively rotating the drive cam, a key lock pin mounted in the housing, and a lock pin channel comprising a portion of the key wherein the key lock pin engages the lock pin channel thereby preventing removal of the key from the valve test apparatus when the engagement cam is in the test position.

The detent mechanism can comprise a pin and a spring adapted to bias the pin toward the engagement shaft. The detent mechanism can be located at an end of the engagement shaft. The engagement shaft can comprise at least one detent adapted for seating of the pin therein, and the at least one detent can correspond to one of the test position and the operational position.

The safety release mechanism can comprise a pin and a spring adapted to bias the pin toward the one of the engagement shaft and the engagement cam, and the one of the engagement shaft and the engagement cam can comprise a detent adapted for seating of the pin therein. The pin can be adapted to be seated in the detent when the engagement cam is in the operational position.

The key can comprise a flag for indicating that the engagement cam is in the test position. A remote operator can be connected to the engagement shaft, a sensor can be adapted to generate information in response to the rotational position of the engagement shaft, and a controller can control the operation of the remote operator in response to the information generated by the sensor to selectively rotate the engagement cam between the test position and the operational position.

In another embodiment, the partial stroke valve test apparatus has a housing enclosing a drive cam operably attached through a shaft to an actuator and an emergency shutdown valve, an engagement cam attached to an engagement shaft for selectively engaging with the drive cam during a partial stroke valve test and selectively rotated between a test position in which the engagement cam engages with the drive cam and an operational position in which the engagement cam is rotated away from the drive cam, and a safety release mechanism in communication with one of the engagement shaft and the engagement cam which can be selectively disengaged for rotation of the engagement cam between the test position and the operational position. The partial stroke valve test apparatus can also comprise a key for selectively rotating the drive cam, a key lock pin mounted in the housing, and a lock pin channel comprising a portion of the key wherein the key lock pin engages the lock pin channel thereby preventing removal of the key from the valve test apparatus when the engagement cam is in the test position.

In another embodiment, the partial stroke valve test apparatus has a housing enclosing a drive cam operably attached through a shaft to an actuator and an emergency shutdown valve, an engagement cam attached to an engagement shaft for selectively engaging with the drive cam during a partial stroke valve test and selectively rotated between a test position in which the engagement cam engages with the drive cam and an operational position in which the engagement cam is rotated away from the drive cam, and a key for selectively rotating the drive cam, a key lock pin mounted in the housing, and a lock pin channel comprising a portion of the key wherein the key lock pin engages the lock pin channel thereby preventing removal of the key from the valve test apparatus when the engagement cam is in the test position.

DETAILED DESCRIPTION

Figures 1, 2:
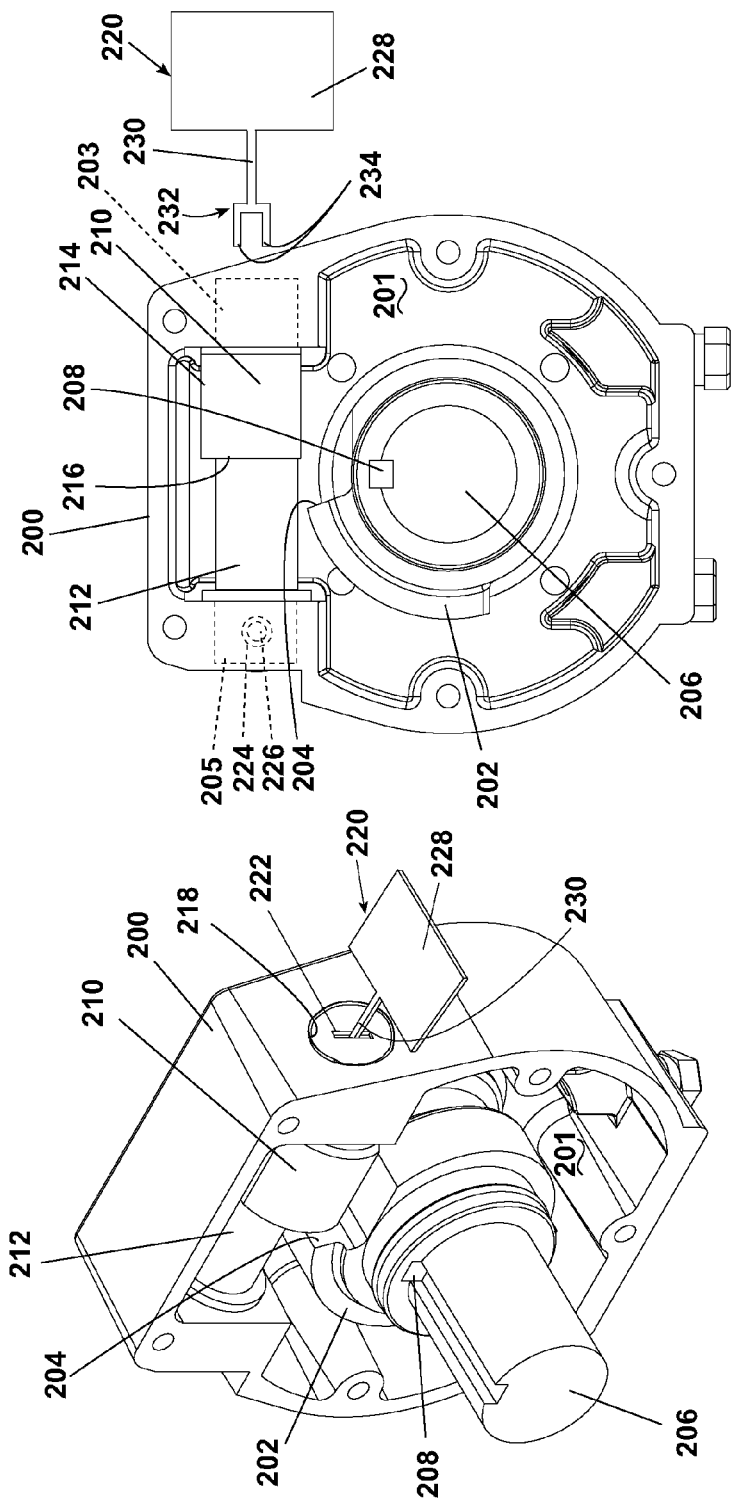
FIG. 1 is a perspective view of a prior art partial stroke valve test apparatus showing the interior components of the apparatus.
FIG. 2 is a plan view of the prior art partial stroke valve test apparatus illustrated in FIG. 1.
Figure 3:
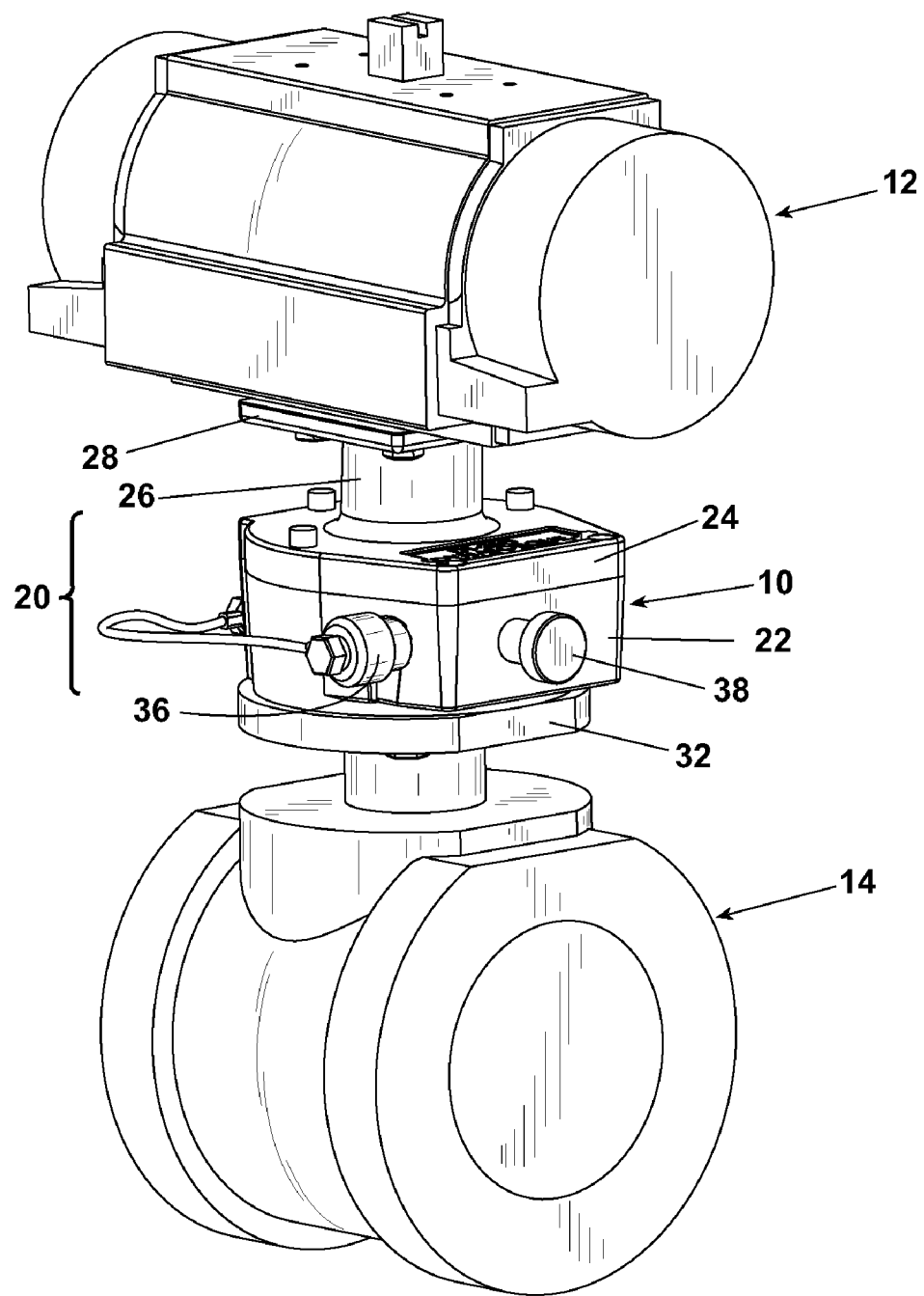
FIG. 3 is a perspective view of a partial stroke valve test apparatus according to the invention operably connected to a valve actuator and an emergency shutdown valve.
Figure 4:
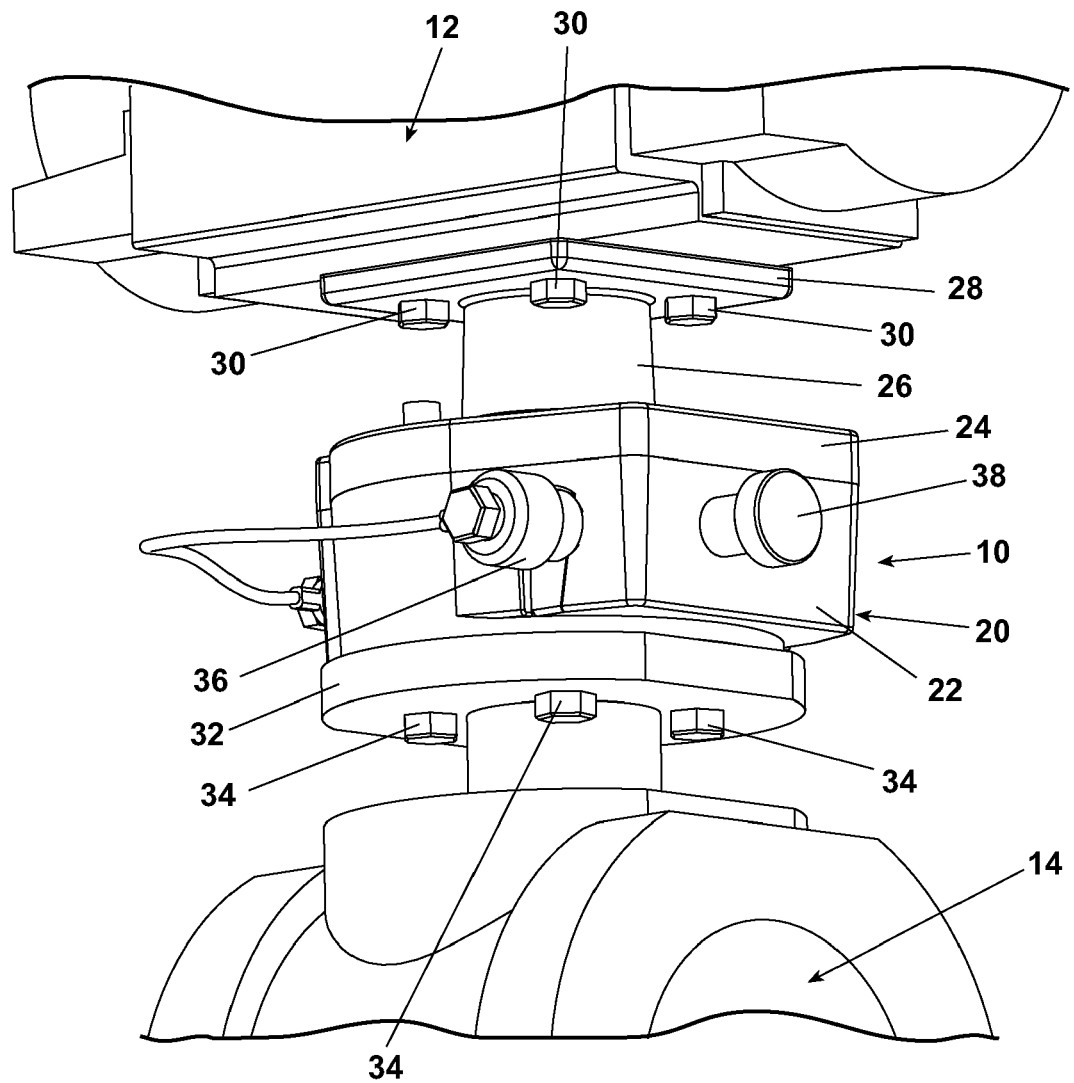
FIG. 4 is a perspective close-up view of the partial stroke valve test apparatus of FIG. 3 comprising a housing having a base portion and a cover.
Figure 5:
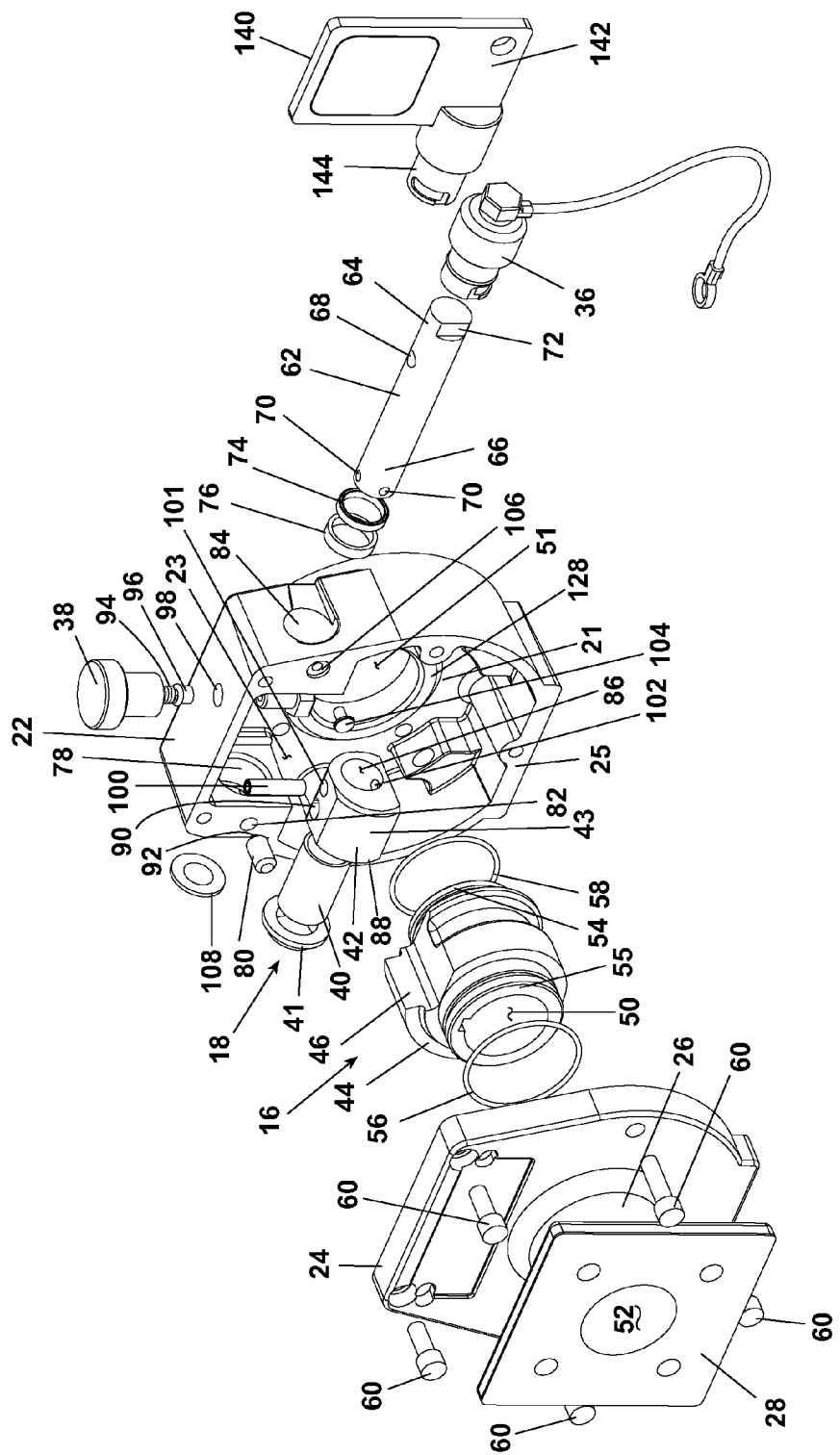
FIG. 5 is an exploded view of the partial stroke valve test apparatus of FIG. 3 showing a drive cam assembly, an engagement cam assembly, an engagement cam key for rotating the engagement cam assembly into a testing position, a safety release mechanism, a key lock mechanism, and a detent mechanism.
Figure 7:
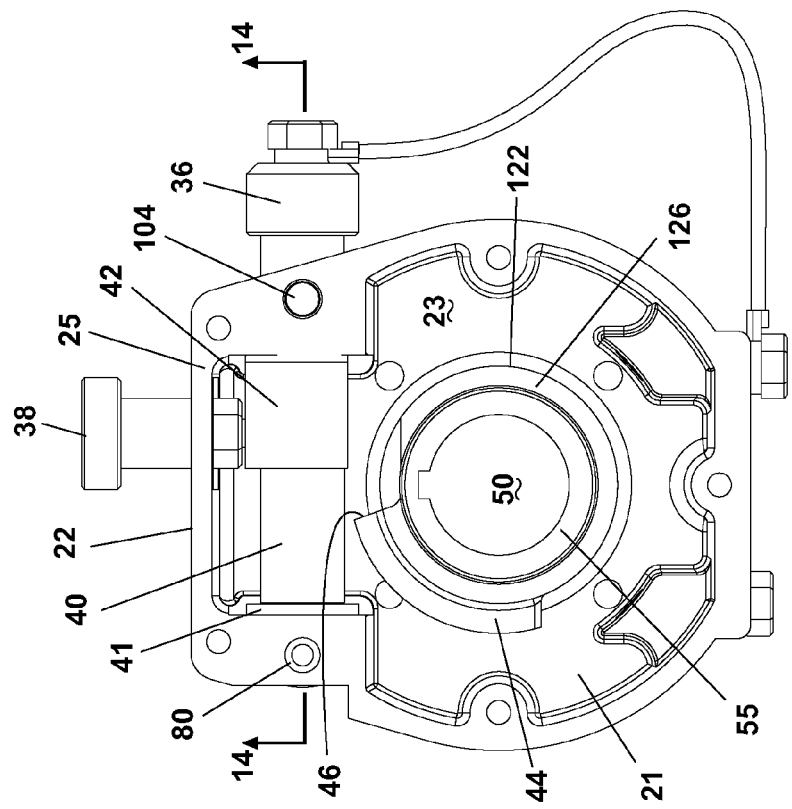
FIG. 7 is a plan view of the partial stroke valve test apparatus of FIG. 6.
Figure 6:
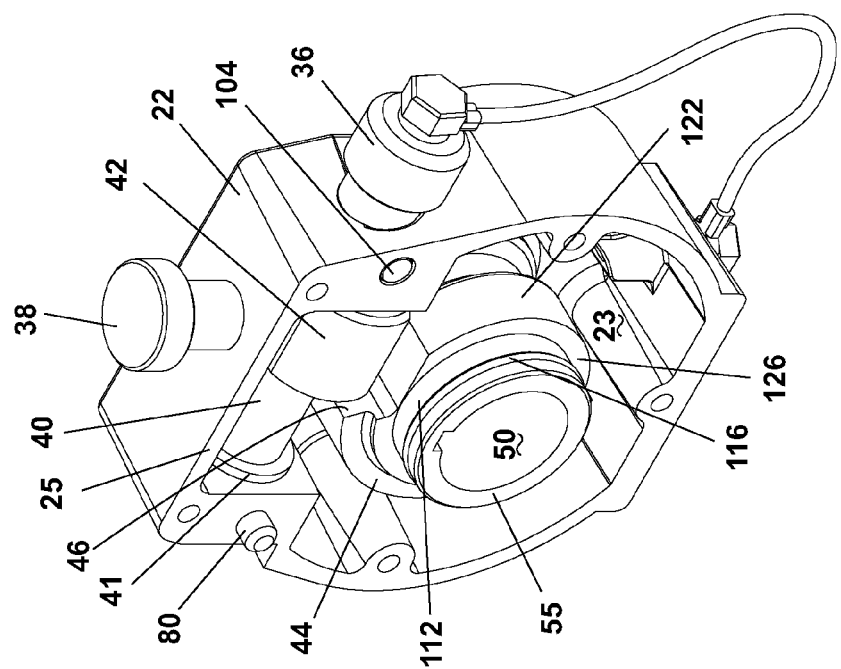
FIG. 6 is a perspective view of the partial stroke valve test apparatus of FIG. 5 in an assembled configuration with the cover removed for clarity.

Referring now to FIGS. 3–5, a partial stroke valve test apparatus 10 according to the invention is mounted between a valve actuator 12 and an emergency shutdown valve 14. The valve test apparatus 10 comprises a housing 20 having a base portion 22 and a cover 24 defining a chamber 23 as shown in FIG. 5. The valve 14 comprises a valve mounting flange 32 to which the base portion 22 of the valve test apparatus 10 is mounted through suitable fasteners 34, such as conventional bolts or other threaded fasteners. The cover 24 comprises a collar 26 terminating in a flange 28 coaxial therewith and orthogonal thereto for attaching the valve test apparatus 10 to the actuator 12 with suitable fasteners 30, such as conventional bolts or other threaded fasteners.

As shown in FIG. 5, the base portion 22 comprises a generally irregularly-shaped, hollow body having a back wall 21 and a perimeter wall 25 defining an irregularly-shaped chamber 23 enclosing a drive cam assembly 16 and an engagement cam assembly 18. The base portion 22 has a base aperture 51 extending through the back wall 21. An annular base bearing face 128 extends around the perimeter of the base aperture 51. A key hole 84 extends through the perimeter wall 25 into an upper portion of the base portion 22 orthogonal to the longitudinal axis of the base portion 22. A bearing seat 78 is provided in the upper portion of the base portion 22 coaxial with the key hole 84 in spaced-apart juxtaposition thereto. The cover 24 is a generally plate-like, irregularly-shaped body adapted for cooperating communication with the base portion 22 and having a cover aperture 52 extending therethrough coaxial with the collar 26 and the flange 28.

Figure 8:
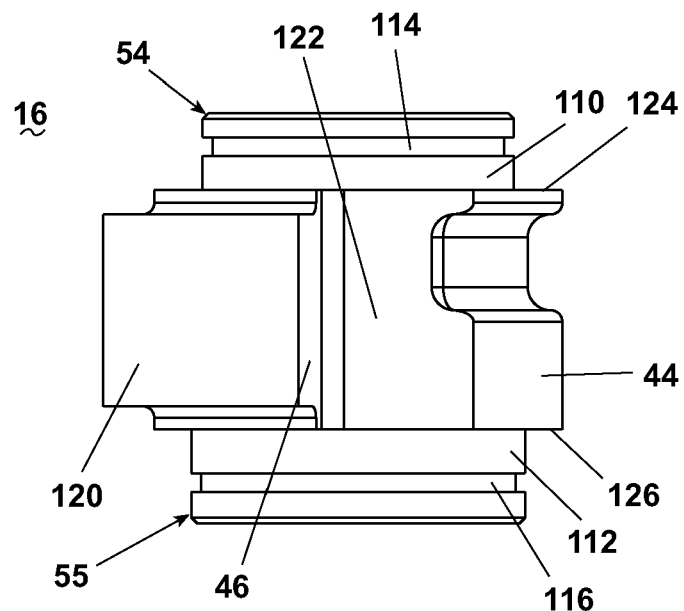
FIG. 8 is a plan view of a drive cam comprising a portion of the drive cam assembly shown in FIG. 5.
Figure 9:
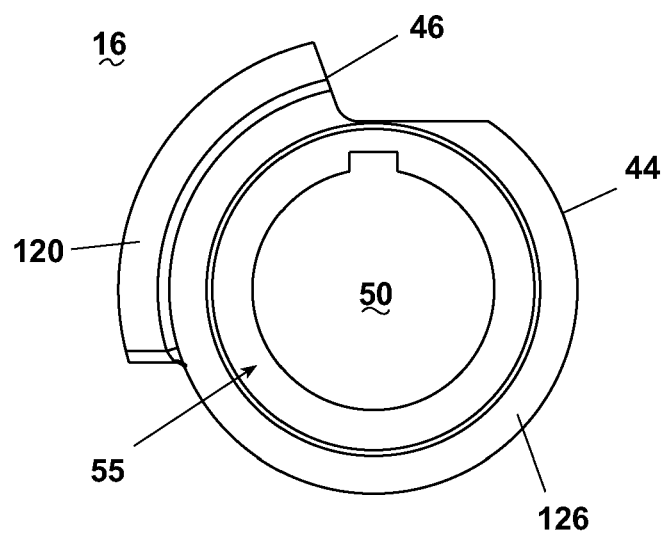
FIG. 9 is an elevational view of the drive cam of FIG. 8.

Referring to FIGS. 5, 8 and 9, the drive cam assembly 16 comprises a drive cam 44 adapted for rotating slidable communication with the base aperture 51 and the cover aperture 52. The drive cam 44 is a somewhat cylindrically-shaped body comprising a generally cylindrical medial portion 122 and an arcuate cam shoulder 120 extending radially outwardly therefrom along a portion of the circumference of the medial portion 122. The cam shoulder 120 terminates in a radially-oriented cam face 46.

A first annular sleeve 54 comprises a generally cylindrically-shaped, collar-like portion having a diameter smaller than the diameter of the medial portion 122 and extending coaxially from a first end of the medial portion 122. The sleeve 54 comprises a circumferential sleeve surface 110 and a circumferential, channel-like ring seal seat 114. The medial portion 122 terminates at the first end in an annular bearing face 124 intersecting the sleeve surface 110 and defining a plane orthogonal to the longitudinal axis of the drive cam 44.

A second annular sleeve 55 comprises a generally cylindrically-shaped, collar-like portion having a diameter smaller than the diameter of the medial portion 122 and extending coaxially from a second end of the medial portion 122. The sleeve 55 comprises a circumferential sleeve surface 112 and a circumferential, channel-like ring seal seat 116. The medial portion 122 terminates at the second end in an annular bearing face 126 intersecting the sleeve surface 112 and defining a plane orthogonal to the longitudinal axis of the drive cam 44.

Extending coaxially through the medial portion 122, the first annular sleeve 54, and the second annular sleeve 55 is a drive coupling aperture 50 for slidable receipt of a conventional drive shaft (not shown) interconnecting the actuator 12 and the emergency shutoff valve 14. Preferably, the drive cam 44 is fixedly attached to the drive shaft through a conventional means of such as a key inserted into a keyway in the drive shaft and the drive cam 44 so that the drive cam 44 rotates with the rotation of the drive shaft.

Figure 10:
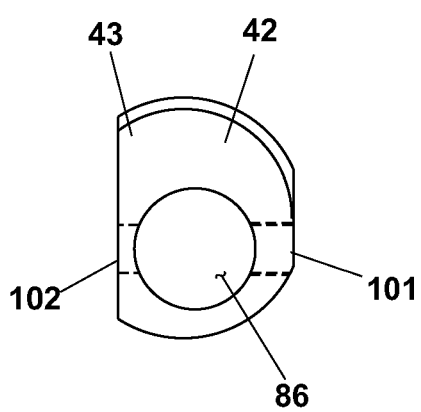
FIG. 10 is an elevational view of the engagement cam comprising a portion of the engagement cam assembly shown in FIG. 5.
Figure 11:
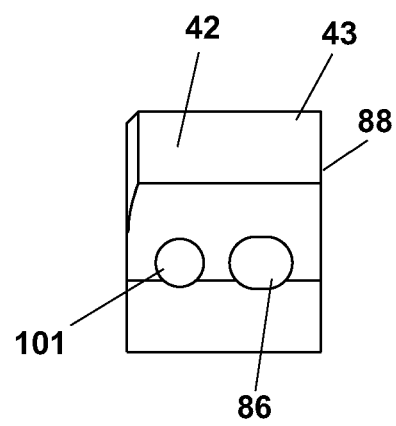
FIG. 11 is a plan view of the engagement cam of FIG. 10.
Figure 12:
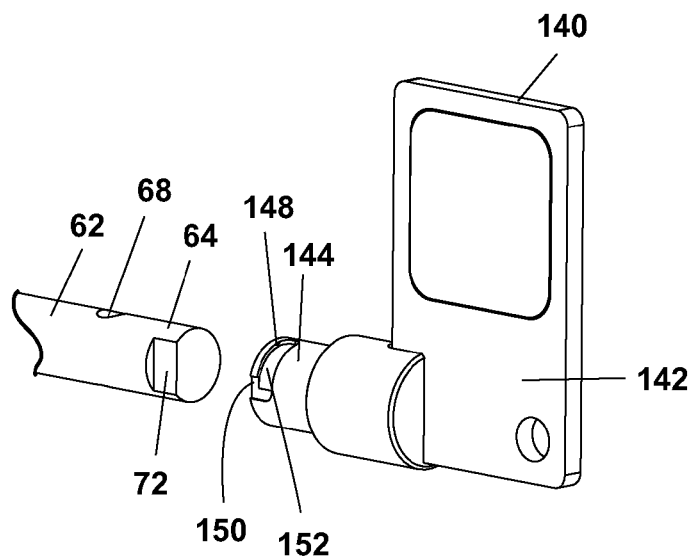
FIG. 12 is a first enlarged perspective view of the engagement cam key and a portion of the engagement cam assembly of FIG. 5.
Figure 13:
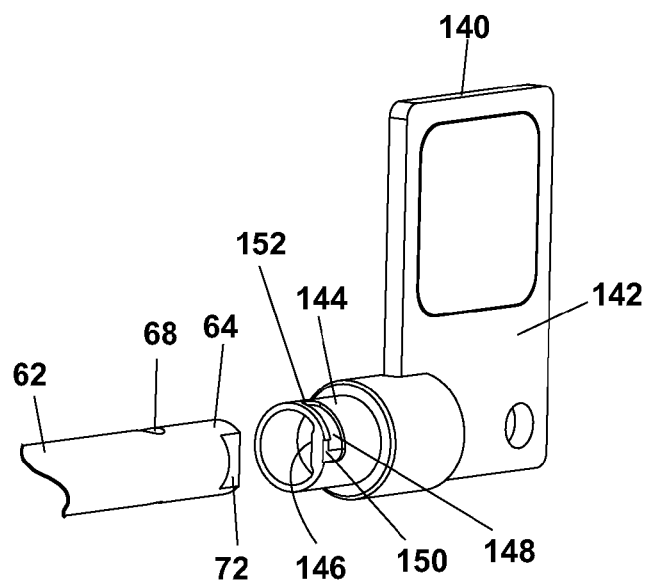
FIG. 13 is a second enlarged perspective view of the engagement cam key and a portion of the engagement cam assembly of FIG. 5.

The engagement cam assembly 18 comprises generally an engagement cam 42, an engagement shaft 62, and an engagement cam key 140. Referring also to FIGS. 10 and 11, the engagement cam 42 comprises an asymmetrically-shaped body having a shoulder 43 and a shaft aperture 86 extending longitudinally therethrough. A first end of the engagement cam 42 terminates in a planar engagement face 88 orthogonal to the longitudinal axis of the engagement cam 42. Extending into the engagement cam 42 orthogonal to the shaft aperture 86 are a safety release seat 90, an upper coil pin aperture 101, and a lower coil pin aperture 102. As shown in FIG. 11, the safety release seat 90 preferably comprises a somewhat oval-shaped socket for receipt of a safety release pin 96 as hereinafter described. The upper coil pin aperture 101 and the lower coil pin aperture 102 extend coaxially in fluid communication with the shaft aperture 86 to form an aperture extending through the engagement cam 42 orthogonal to the shaft aperture 86.

The engagement shaft 62 is an elongated, generally cylindrically-shaped member having a key end 64 and a detent end 66 and adapted for slidable insertion into the shaft aperture 86. The key end 64 comprises a truncated portion forming a planar face 72, and a radial coil pin aperture 68 spaced away from the planar face 72 and extending through the engagement shaft 62. The detent end 66 comprises a pair of circular detent seats 70 spaced 90 degrees to each other. The engagement shaft 62 can also comprise the safety release seat 90 for receipt of the safety release pin 96. In this embodiment, the engagement cam 42 does not comprise the safety release seat 90.

Figure 14:
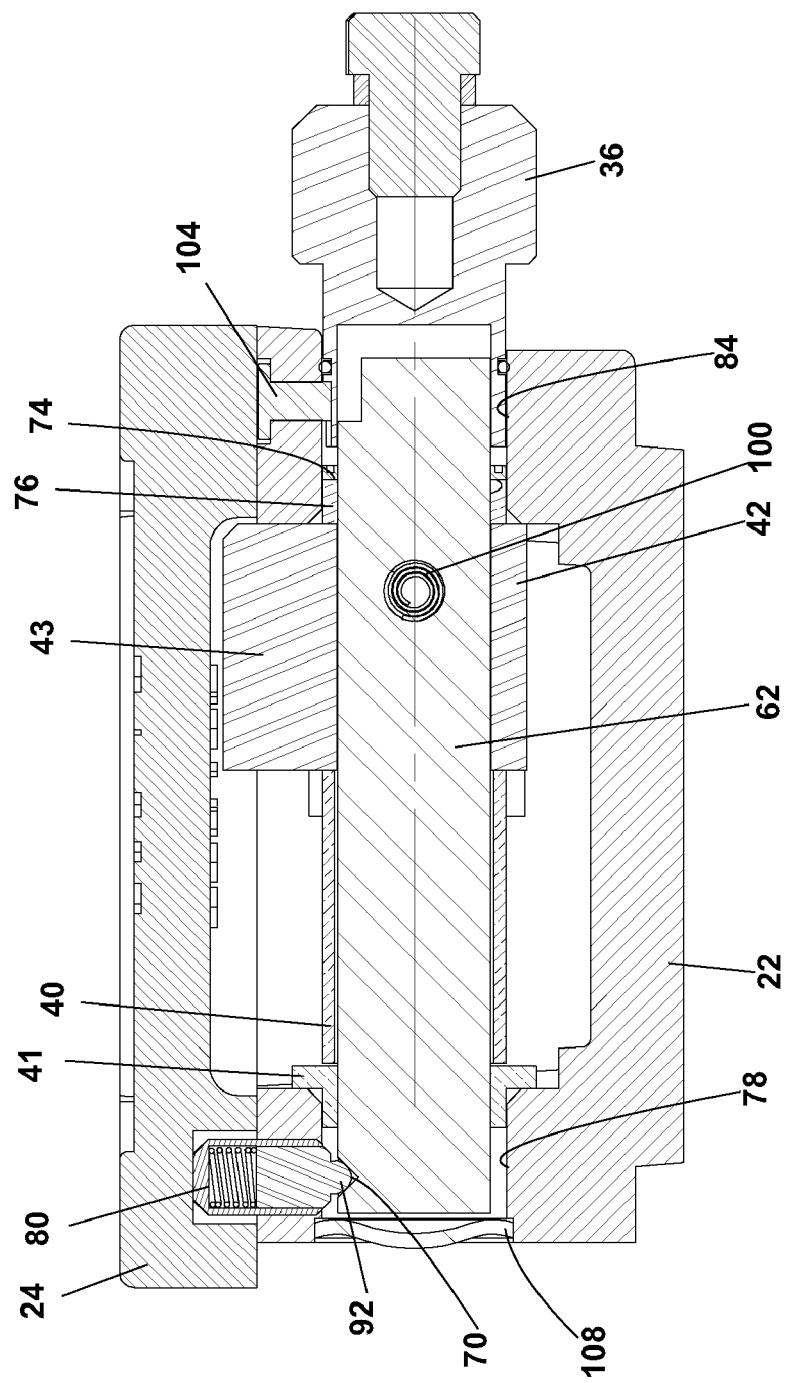
FIG. 14 is a sectional view of a portion of the partial stroke valve test apparatus taken along line 14—14 of FIG. 7.

Referring also to FIG. 14, a flanged bearing 41 comprises a collar-like body having an annular flange and adapted for seating communication with the bearing seat 78 and slidable receipt of the engagement shaft 62. A spacer 40 comprises a generally cylindrical, elongated sleeve which is slidably received over the engagement shaft 62 for spacing the engagement cam 42 away from the flange bearing 41. A sleeve bearing 76 comprises a ring-like body which is slidably received over the engagement shaft 62. A ring seal 74 comprises a resilient seal, such as an O-ring, which is slidably received over the engagement shaft 62 adjacent the sleeve bearing 76.

A detent 80 comprises a spring-biased mechanism well-known in the art and having a detent pin 92. A pin aperture 82 extends through the perimeter wall 25 to intersect the bearing seat 78. The detent 80 is slidably retained in the pin aperture 82 so that the detent pin 92 extends through the action of the spring-biased mechanism radially into the detent seat 70. A key lock pin 104 comprises a pin-like body which is inserted into a lock pin aperture 106 extending through the perimeter wall 25 to intersect the key hole 84 so that the key lock pin 104 extends radially partly into the key hole 84.

A safety release mechanism comprises a safety release knob 38 comprising a helical spring 94 and a safety release pin 96. A safety release aperture 98 extends through the perimeter wall 25 into an upper portion of the chamber 23, and is adapted for coaxial alignment with the safety release seat 90. The safety release knob 38 is inserted into the safety release aperture 98 with the helical spring 94 and safety release pin 96 in the chamber 23 so that the safety release knob 38 is biased inwardly by the action of the spring 94 and the safety release pin 96 can be seated in the safety release seat 90. An engagement shaft plug 108 is a circular, shallow dish-shaped body which is inserted in the bearing seat 78 for sealing the engagement shaft 62 in the housing 20.

The engagement cam key 140 is a conventional key-shaped body comprising a rectilinear, plate-like flag 142 and a generally cylindrical annular collar 144 extending outwardly from a first end of the flag 142. The flag 142 can be provided with indicators, such as coloring, symbols, or a profile, to draw the attention of an operator and clearly indicate whether the valve test apparatus 10 is in the testing or operational condition. The collar 144 comprises an annular wall having a flattened shoulder 146 along a portion of the inner surface of the collar 144. A lock pin channel 148 extends partially circumferentially around the exterior of the collar 144 and comprises a longitudinal portion 150 and a circumferential portion 152. The longitudinal portion 150 is aligned with the center of the flattened shoulder 146. Referring also to FIG. 4, when the key 140 is inserted in the key hole 84, the key lock pin 104 will be received in the longitudinal portion 150 of the lock pin channel 148. When the key 140 is rotated 90 degrees counterclockwise, the key lock pin 104 will travel along the circumferential portion 152 of the lock pin channel 148 to prevent the key 140 from being removed until the key 140 is rotated 90 degrees clock-wise.

Referring now to FIGS. 5–7 and 14, the valve test apparatus 10 is assembled by placing the ring seal 74 and sleeve bearing 76 over the engagement shaft 62 and inserting the engagement shaft 62 through the key hole 84. As the engagement shaft 62 is inserted through the key hole 84, the engagement shaft 62 is inserted through the shaft aperture 86 in the engagement cam 42, the spacer 40, and the flanged bearing 41. The flanged bearing 41 is inserted into the bearing seat 78, and the detent end 66 is inserted through the flanged bearing 41 into the bearing seat 78. The engagement cam 42 is fixedly attached to the engagement shaft 62 by aligning the coil pin apertures 101, 102 with the coil pin aperture 68 and press fitting a conventional coil pin 100 into the apertures. The safety release knob 38 is installed to the base portion 22 through the safety release aperture 98 so that the safety release pin 96 can be inserted into the safety release seat 90, where it will be held by the action of the spring 94. The detent 80 and the key lock pin 104 are installed in their respective apertures 82, 106, and will be held in place by the cover 24.

The drive cam 44 is installed into the valve test apparatus 10 by first placing a first resilient ring seal 58, such as an O-ring, in the ring seal seat 114 and a second resilient ring seal 56 in the ring seal seat 116. The annular sleeve 54 is then slidably inserted into the base aperture 51 so that the bearing face 124 is in slidable communication with the base bearing face 128. When the cover 24 is installed, the annular sleeve 55 will be inserted into the cover aperture 52 so that the bearing face 126 is in slidable communication with a similar bearing face (not shown) in the cover 24. A drive shaft (not shown) can be inserted through the drive coupling aperture 50 and fixedly attached to the drive cam 44 as previously described, to extend through the apertures 51, 52 for operable communication with the actuator 12 and the valve 14.

A key port cover 36 can be inserted into the key hole 84 to conceal and protect the key end 64 of the engagement shaft 62.

Figure 15:
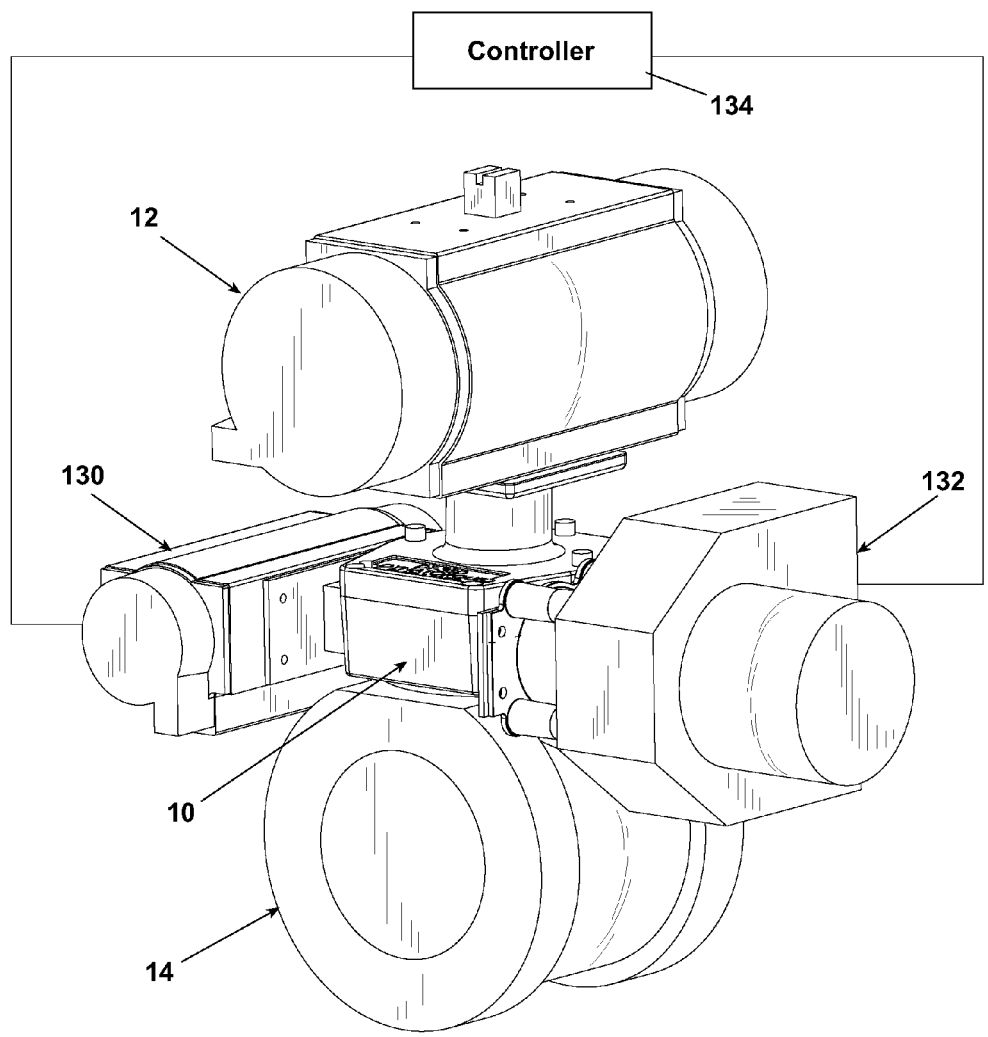
FIG. 15 is a perspective, partially schematic view of a second embodiment of the partial stroke valve test apparatus comprising a remotely controlled test activation system.

Referring now to FIG. 15, a second embodiment of the invention comprises a remotely-controlled partial stroke valve test apparatus 10 generally as described herein and comprising a remote operator 130, a switch sensor 132, and a controller 134. The remote operator 130 is well-known in the art for selectively rotating the engagement shaft 62 in response to a signal generated and delivered from the controller 134. The switch sensor 132 is well-known in the art, and senses the rotated position of the engagement shaft 62, transmitting this information to the controller 134. As shown in FIG. 15, the remote operator 130 is operably attached through a suitable connection to the key end 64 of the engagement shaft 62, and replaces the engagement cam key 140, which is not utilized in this embodiment. The switch sensor 132 is attached through a suitable connection to the detent end 66 of the engagement shaft 62 for monitoring the rotated position of the engagement shaft 62. The partial stroke valve test apparatus 10 shown in FIG. 15 does not comprise the safety release knob 38, which can be eliminated due to the operational control of the engagement shaft 62 provided by the remote operator 130. However, the safety release knob 38 can be retained in the remotely controlled valve test apparatus 10 to ensure that the engagement shaft 62 is not inadvertently rotated by the remote operator 130.

Figure 16:
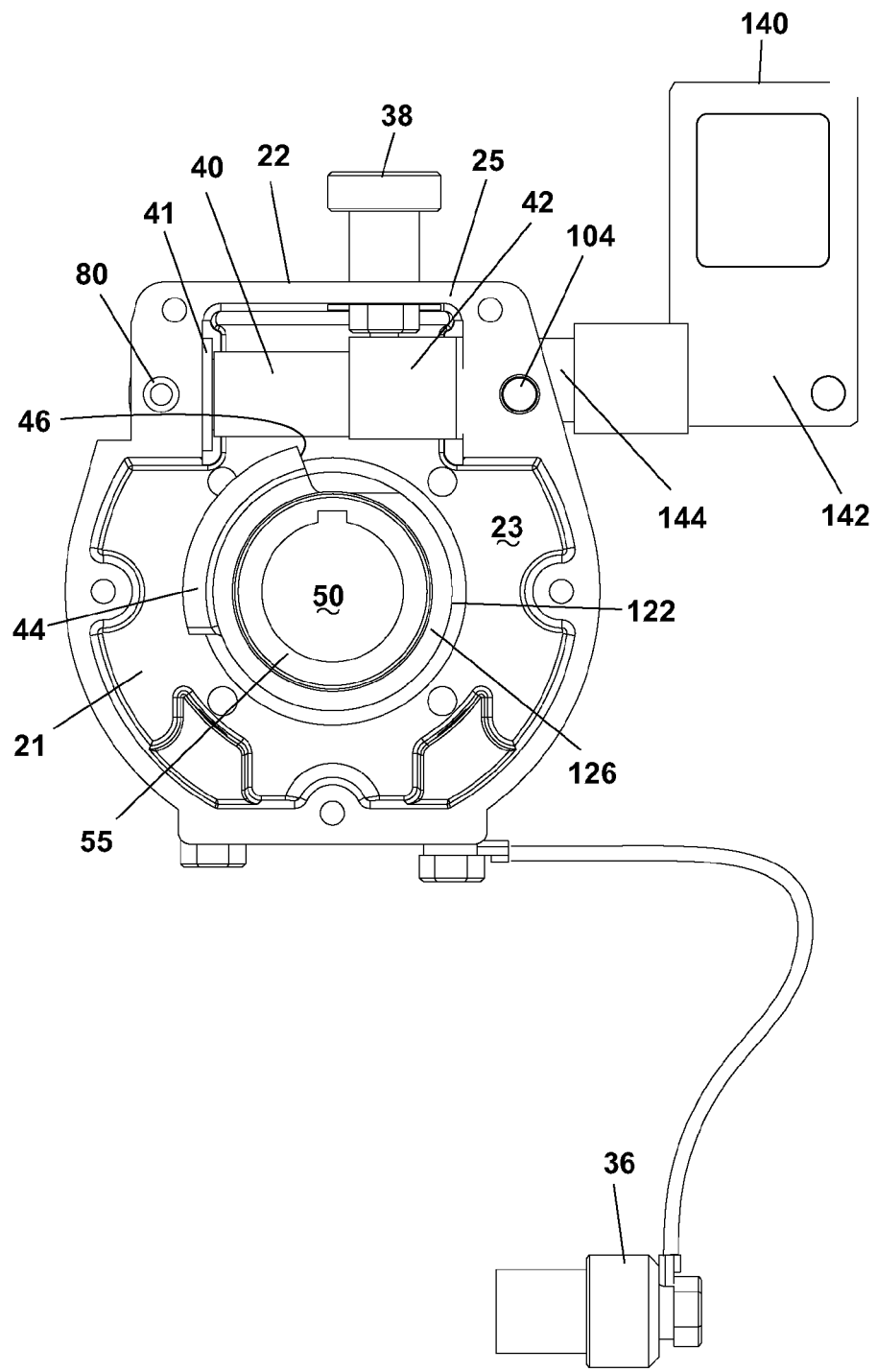
FIG. 16 is a plan view with the cover removed of the partial stroke valve test apparatus of FIG. 3 showing the engagement cam key installed prior to placing the valve test apparatus in a test condition.
Figure 17:
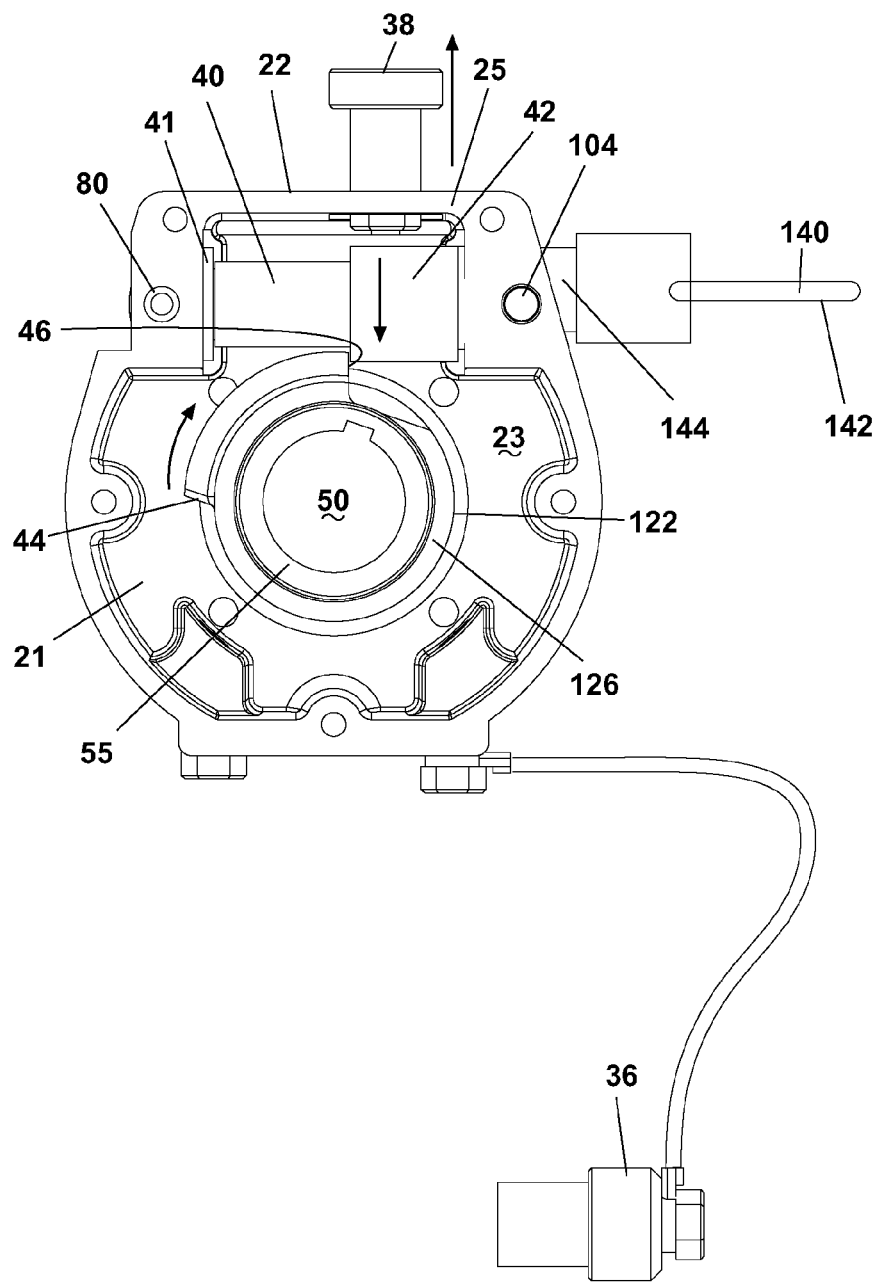
FIG. 17 is a plan view of the partial stroke valve test apparatus of FIG. 16 showing the engagement cam key rotated to place the valve test apparatus in a test condition.

Referring now to FIG. 16, a partial stroke valve test apparatus 10 is shown in an operational condition, and prepared to be activated for a test by insertion of the key 140 in the key hole 84 in operable communication with the engagement shaft 62. As shown in FIG. 16, there is sufficient clearance between the engagement cam 42 and the drive cam 44 so that the drive cam 44 and attached shaft can be fully rotated by the actuator 12 to close the emergency shut down valve 14 in the event of an emergency. The safety release knob 38 is also positioned so that the safety release pin 96 is seated in the safety release seat 90 to engage the engagement cam 42 and prevent the rotation of the engagement shaft 62 and the engagement cam 42. Referring now to FIG. 17, the valve test apparatus 10 is shown in a testing position, which is achieved by rotating the key 90 degrees counterclockwise, thereby rotating the engagement shaft 62 and the engagement cam 42 counterclockwise to position the shoulder 43 and cam face 88 in blocking juxtaposition with the cam face 46 of the drive cam 44. As shown in FIG. 17, rotation of the drive cam 44 will be limited by the engagement cam face 46 contacting the drive cam face 88. In order to rotate the engagement cam key 140, the engagement shaft 62, and the engagement cam 42 one-quarter turn, the safety release knob 38 must first be pulled outwardly to remove the safety release pin 96 from the safety release seat 90. Furthermore, as the engagement shaft 62 is rotated, the detent 80 will alternately disengage and engage the detent seats 70, providing a positive stop for the engagement shaft 62 and further indicating the proper positioning of the engagement shaft 62. As discussed previously, the engagement cam key 140 cannot be removed from the valve test apparatus 10 while it is in the testing position, and provides a positive indication that the valve is in the testing condition by the orientation of the flag 142 relative to the housing 20 of the valve test apparatus 10.

The engagement cam key lock assembly prevents the inadvertent removal of the key from the partial stroke valve test apparatus when the valve test apparatus is in the testing position. This minimizes the possibility that the valve test apparatus is left in the testing condition, thus preventing full closure of the valve in the event of an emergency. The key also remains in the valve test apparatus to indicate that the apparatus is in the testing condition. The valve test apparatus is further protected against being inadvertently placed in a testing condition by the safety release mechanism. In order for the valve test apparatus to be placed in the testing condition, the safety release knob must be pulled while the engagement cam key is turned. With the engagement cam in the testing condition, the safety release knob remains in the extended position, providing a further indication that the apparatus is in the testing condition. Finally, the positive stop detent feature provides additional protection against inadvertent rotation of the engagement shaft.

While the invention has been specifically described in connection with certain embodiments thereof, it is to be understood that this is by way of illustration and not of limitation. Reasonable variation and modification are possible within the scope of the forgoing description and drawings without departing from the spirit of the invention, which is described in the appended claims.

What is claimed is:

1. In a partial stroke valve test apparatus having a housing enclosing a drive cam operably attached through a shaft to an actuator and an emergency shutdown valve, and an engagement cam attached to a cylindrical engagement shaft for selectively engaging with the drive cam during a partial stroke valve test and selectively rotated between a test position in which the engagement cam engages with the drive cam and an operational position in which the engagement cam is rotated away from the drive cam, the improvement comprising:
   a detent radially communicating with the engagement shaft for selectively maintaining the partial stroke valve test apparatus in the test position or the operational position; and
   a key for selectively rotating the drive cam, a key lock pin mounted in the housing, and a lock pin channel comprising a portion of the key wherein the key lock pin engages the lock pin channel, thereby preventing removal of the key from the valve test apparatus when the engagement cam is in the test position.

2. The partial stroke valve test apparatus of claim 1 and further comprising a safety release mechanism in communication with one of the engagement shaft and the engagement cam which can be selectively disengaged for rotation of the engagement cam between the test position and the operational position.

3. The partial stroke valve test apparatus of claim 2 wherein the safety release mechanism comprises a pin and a spring adapted to bias the pin toward the one of the engagement shaft and the engagement cam.

4. The partial stroke valve test apparatus of claim 3 wherein the one of the engagement shaft and the engagement cam comprises a seat adapted for seating of the pin therein.

5. The partial stroke valve test apparatus of claim 4 wherein the pin is adapted to be seated in the seat when the engagement cam is in the operational position.

6. The partial stroke valve test apparatus of claim 2 and further comprising a remote operator connected to the engagement shaft, a sensor adapted to generate information in response to the rotational position of the engagement shaft, and a controller for controlling the operation of the remote operator in response to the information generated by the sensor to selectively rotate the engagement cam between the test position and the operational position.

7. The partial stroke valve test apparatus of claim 1 wherein the detent comprises a detent pin and a spring adapted to bias the detent pin toward the engagement shaft.

8. The partial stroke valve test apparatus of claim 7 wherein the detent is located at an end of the engagement shaft.

9. The partial stroke valve test apparatus of claim 7 wherein the engagement shaft comprises at least one seat adapted for seating of the detent pin therein.

10. The partial stroke valve test apparatus of claim 9 wherein the at least one seat corresponds to one of the test position and the operational position.

11. The partial stroke valve test apparatus of claim 1 wherein the key comprises a flag for indicating that the engagement cam is in the test position.

12. The partial stroke valve test apparatus of claim 1 and further comprising a remote operator connected to the engagement shaft, a sensor adapted to generate information in response to the rotational position of the engagement shaft, and a controller for controlling the operation of the remote operator in response to the information generated by the sensor to selectively rotate the engagement cam between the test position and the operational position.

13. In a partial stroke valve test apparatus having a housing enclosing a drive cam operably attached through a shaft to an actuator and an emergency shutdown valve, and an engagement cam attached to an engagement shaft for selectively engaging with the drive cam during a partial stroke valve test and selectively rotated between a test position in which the engagement cam engages with the drive cam and an operational position in which the engagement cam is rotated away from the drive cam, the improvement comprising:
   a safety release mechanism in communication with one of the engagement shaft and the engagement cam which can be selectively disengaged for rotation of the engagement cam between the test position and the operational position; and
   a key for selectively rotating the drive cam, a key lock pin mounted in the housing, and a lock pin channel comprising a portion of the key wherein the key lock pin engages the lock pin channel thereby preventing removal of the key from the valve test apparatus when the engagement cam is in the test position.

14. The partial stroke valve test apparatus of claim 13 wherein the safety release mechanism comprises a pin and a spring adapted to bias the pin toward the one of the engagement shaft and the engagement cam.

15. The partial stroke valve test apparatus of claim 14 wherein the one of the engagement shaft and the engagement cam comprises a seat adapted for seating of the pin therein.

16. The partial stroke valve test apparatus of claim 15 wherein the pin is adapted to be seated in the seat when the engagement cam is in the operational position.

17. The partial stroke valve test apparatus of claim 13 wherein the key comprises a flag for indicating that the engagement cam is in the test position.

18. The partial stroke valve test apparatus of claim 17 and further comprising a remote operator connected to the engagement shaft, a sensor adapted to generate information in response to the rotational position of the engagement shaft, and a controller for controlling the operation of the remote operator in response to the information generated by the sensor to selectively rotate the engagement cam between the test position and the operational position.

19. In a partial stroke valve test apparatus having a housing enclosing a drive cam operably attached through a shaft to an actuator and an emergency shutdown valve, and an engagement cam attached to an engagement shaft for selectively engaging with the drive cam during a partial stroke valve test and selectively rotated between a test position in which the engagement cam engages with the drive cam and an operational position in which the engagement cam is rotated away from the drive cam, the improvement comprising:
  a key for selectively rotating the drive cam, a key lock pin mounted in the housing, and a lock pin channel comprising a portion of the key wherein the key lock pin engages the lock pin channel thereby preventing removal of the key from the valve test apparatus when the engagement cam is in the test position.

20. The partial stroke valve test apparatus of claim 19 wherein the key comprises a flag for indicating that the engagement cam is in the test position.

21. The partial stroke valve test apparatus of claim 19 and further comprising a detent at an end of the engagement shaft for selectively maintaining the partial stroke valve test apparatus in the test position or the operational position, and a safety release mechanism in communication with one of the engagement shaft and the engagement cam which can be selectively disengaged for rotation of the engagement cam between the test position and the operational position.

22. The partial stroke valve test apparatus of claim 21 wherein the detent comprises a detent pin and a spring adapted to bias the pin toward the engagement shaft.

23. The partial stroke valve test apparatus of claim 22 wherein the detent is located at an end of the engagement shaft.

24. The partial stroke valve test apparatus of claim 22 wherein the engagement shaft comprises at least one seat adapted for seating of the detent pin therein.

25. The partial stroke valve test apparatus of claim 24 wherein the at least one seat corresponds to one of the test position and the operational position.

26. The partial stroke valve test apparatus of claim 21 wherein the safety release mechanism comprises a pin and a spring adapted to bias the pin toward the one of the engagement shaft and the engagement cam.

27. The partial stroke valve test apparatus of claim 26 wherein the one of the engagement shaft and the engagement cam comprises a seat adapted for seating of the pin therein.

28. The partial stroke valve test apparatus of claim 27 wherein the pin is adapted to be seated in the seat when the engagement cam is in the operational position.

29. The partial stroke valve test apparatus of claim 21 wherein the key comprises a flag for indicating that the engagement cam is in the test position.

30. In a partial stroke valve test apparatus having a housing enclosing a drive cam operably attached through a shaft to an actuator and an emergency shutdown valve, and an engagement cam attached to a cylindrical engagement shaft for selectively engaging with the drive cam during a partial stroke valve test and selectively rotated between a test position in which the engagement cam engages with the drive cam and an operational position in which the engagement cam is rotated away from the drive cam, the improvement comprising:
  a remote operator connected to the engagement shaft, a sensor adapted to generate information in response to the rotational position of the engagement shaft, and a controller for controlling the operation of the remote operator in response to the information generated by the sensor to selectively rotate the engagement cam between the test position and the operational position;
  a safety release mechanism in communication with one of the engagement shaft and the engagement cam which can be selectively disengaged for rotation of the engagement cam between the test position and the operational position;
  wherein the safety release mechanism comprises a pin and a spring adapted to bias the pin toward the one of the engagement shaft and the engagement cam.

31. The partial stroke valve test apparatus of claim 30 wherein the one of the engagement shaft and the engagement cam comprises a seat adapted for seating of the pin therein.

32. The partial stroke valve test apparatus of claim 31 wherein the pin is adapted to be seated in the seat when the engagement cam is in the operational position.

33. In a partial stroke valve test apparatus having a housing enclosing a drive cam operably attached through a shaft to an actuator and an emergency shutdown valve, and an engagement cam attached to a cylindrical engagement shaft for selectively engaging with the drive cam during a partial stroke valve test and selectively rotated between a test position in which the engagement cam engages with the drive cam and an operational position in which the engagement cam is rotated away from the drive cam, the improvement comprising:
  a remote operator connected to the engagement shaft, a sensor adapted to generate information in response to the rotational position of the engagement shaft, and a controller for controlling the operation of the remote operator in response to the information generated by the sensor to selectively rotate the engagement cam between the test position and the operational position; and
  a detent at an end of the engagement shaft for selectively maintaining the partial stroke valve test apparatus in the test position or the operational position;
  wherein the detent comprises a detent pin and a spring adapted to bias the detent pin toward the engagement shaft.

34. The partial stroke valve test apparatus of claim 33 wherein the detent is located at an end of the engagement shaft.

35. The partial stroke valve test apparatus of claim 33 wherein the engagement shaft comprises at least one seat adapted for seating of the detent pin therein.

36. The partial stroke valve test apparatus of claim 35 wherein the at least one seat corresponds to one of the test position and the operational position.

* * * * *